United States Patent

Shida

[11] Patent Number: 6,018,558
[45] Date of Patent: Jan. 25, 2000

[54] SIGNAL DISCONNECTION DETECTION CIRCUIT THAT ENSURES POSITIVE DETECTION OF SIGNAL DISCONNECTION

[75] Inventor: Yasunari Shida, Tokyo, Japan

[73] Assignee: NEC Corporation, Tokyo, Japan

[21] Appl. No.: 08/984,820

[22] Filed: Dec. 4, 1997

[30] Foreign Application Priority Data

Dec. 5, 1996 [JP] Japan .................................. 8-325682

[51] Int. Cl.⁷ ...................................................... G07C 3/00
[52] U.S. Cl. ............................................................ 377/16
[58] Field of Search .................................... 377/16, 20, 15

[56] References Cited

U.S. PATENT DOCUMENTS

| 4,698,829 | 10/1987 | Di Giulio | 377/16 |
| 4,751,721 | 6/1988 | Wissell | 377/20 |
| 5,442,671 | 8/1995 | Wollschlager et al. | 377/55 |
| 5,455,848 | 10/1995 | Baker et al. | 377/2 |
| 5,663,933 | 9/1997 | Eitrich | 368/119 |

FOREIGN PATENT DOCUMENTS 3-36848 2/1991 Japan .

*Primary Examiner*—Kenneth B. Wells
*Assistant Examiner*—Hai L. Nguyen
*Attorney, Agent, or Firm*—Scully, Scott, Murphy & Presser

[57] ABSTRACT

A signal disconnection detection circuit has a first comparing unit for producing a signal disconnection recognition signal only when a level of the first input signal is smaller than a first threshold value; a second comparing unit for producing an incomming signal only when a level of a second input signal is larger than a second threshold value; and a counter that receives the outputs of the first and second comparing unit and starts counting up when the first comparing unit produces the signal disconnection recognition signal, determining the possibility of the signal disconnection. The counter resets the counted value and stops its operation, determining that a reception signal is not disconnected, when the second comparing unit produces the reception signal. The counter produces the signal disconnection detection signal, determining that the signal is actually disconnected, when the second comparing unit produces no incomming signal before completion of the counting up.

6 Claims, 8 Drawing Sheets

SIGNAL DISCONNECTION DETECTION CIRCUIT THAT ENSURES POSITIVE DETECTION OF SIGNAL DISCONNECTION

BACKGROUND OF THE INVENTION

The present invention relates to a signal disconnection detection circuit. More particularly, the present invention relates to a signal disconnection detection circuit that is applicable to subscriber line terminals (SLTs) for a digital subscriber line transmission system.

Signal disconnection detection circuits of this type are disclosed in, for example, Japanese Patent Laid-Open No. 3-36848. A reception signal detecting circuit disclosed therein is used to detect the presence of a reception signal in a reception circuit within a line terminal for a digital subscriber line transmission system.

The reception circuit has a waveform equalizer, an A/D converter, a symbol discrimination circuit, and a reception signal detecting circuit. The waveform equalizer is for equalizing a waveform of a reception signal and for shaping a waveform of the reception signal degraded due to transmission path characteristics. The A/D converter is for converting an analog output of the waveform equalizer into a digital signal. The signal discrimination circuit and the reception signal detecting circuit each receives an output of the A/D converter.

The reception signal detecting circuit has a positive comparator, a negative comparator, an AND circuit, and a protection circuit. The positive comparator compares an input signal with a positive threshold value. The negative comparator compares the input signal with a negative threshold value. The AND circuit receives the outputs of the positive and negative comparators.

Operation of the above-mentioned reception signal detecting circuit is described. In this example, a four-value signal is used with the levels of ′1 and ±3. The output of the A/D converter is supplied to the positive comparator and the negative comparator. The positive comparator compares the input signal with the positive threshold value. The positive comparator then produces a positive detection signal at a high level only when the input signal is smaller than the positive threshold value.

On the other hand, the negative comparator compares the input signal with the negative threshold value. The negative comparator produces a negative detection signal at a high level only when the input signal is larger than the negative threshold value. The positive and negative threshold values herein are determined between a transmission signal level and a zero level. In other words, the positive and negative threshold values are determined to have a value that is smaller than the level range of the ±1 level transmission signal and that is larger than a noise level. Comparisons in the positive and negative comparators are performed every time of symbol discrimination.

The protection circuit is for use in avoiding incorrect decision due to, for example, noises on a line. The protection circuit considers, as the detection of a reception signal, a predetermined number of protection stages being reached for the number of detection signals produced during a predetermined period by the positive and negative comparators. In response to the detection, the protection circuit produces a detection signal DET.

An exemplified protection circuit ANDs reproduction clocks that are extracted from the reception signal. The protection circuit counts up the number of times (number of pulses) when both the positive and negative comparators produce the signal of logic "1" during a unit time (such as a single frame of data). When the counted value is equal to or larger than a predetermined number, then the protection circuit determines signal disconnection and produces a signal of logic "1". Otherwise, the protection circuit produces a signal of logic "0".

Reception circuits with a decision feedback equalizer have been proposed in order to improve equalization characteristics and reduce training time in the reception circuit having the above-mentioned configuration. The outputs with different isolated response waveforms are produced from the waveform equalizer with or without the decision feedback equalizer. Without the decision feedback equalizer, the waveform equalizer is required to make the amplitude obtained at all sample points other than a decision point be zero. On the other hand, the waveform equalizer is required to make only the amplitude obtained at sample points before the decision point be zero.

A signal disconnection detection circuit with the decision feedback equalizer is described below. The signal disconnection detection circuit comprises an absolute value circuit, an average value circuit, and a comparator. The reception signal is supplied to the absolute value circuit. An output of the absolute value circuit is supplied to the average value circuit. An output of the average value circuit is then supplied to the comparator. The absolute value circuit takes an absolute value of the reception signal. The average value circuit monitors absolute value signals for individual samples for a predetermined time and calculates an average value level during that period. The comparator compares the average value level with a predetermined threshold value. The comparator determines the presence of a signal when the average value level is larger than the predetermined threshold. The comparator determines the disconnection of the signal when the average value level is smaller than the predetermined threshold.

The average value circuit is formed of a unit delay circuit and an adder. The average value circuit monitors the signals for a period determined by the unit delay circuit to obtain an average of the absolute value signals for the individual samples.

However, the above mentioned signal disconnection detection circuit may sometimes not detect the disconnection of the signal when the decision feedback equalizer is used as the waveform equalizer. The reason is as follows. The decision feedback equalizer estimates intersymbol interference due to post-cursors according to the result of the symbol discrimination. The decision feedback equalizer thus produces an incorrect post-cursor estimation if it receives a signal other than the discrimination signal that is produced upon the disconnection, though the signal is actually disconnected. The signal disconnection detection circuit considers the incorrect estimation as a signal. This means that the decision feedback equalizer doesn't produce a zero output. The signal disconnection detection circuit detects no signal disconnection indefinitely.

The average value circuit requires an arithmetic unit that enlarges the circuit itself. In addition, it takes a relatively long time to detect the signal disconnection after the reception of the signal because of the calculation for an average value during a certain period. Furthermore, detection characteristics for the comparator depend on the predetermined threshold value, so that it is difficult to determine this threshold value.

SUMMARY OF THE INVENTION

An object of the present invention is to provide a signal disconnection detection circuit that ensures positive detection of signal disconnection even when a decision feedback equalizer is used as the waveform equalizer.

A signal disconnection detection circuit according to a first aspect of the present invention comprises a threshold value generation circuit having first and second output terminals for generating first and second threshold values to produce simultaneously the first and second threshold values from the first and second output terminals, respectively, the first and second threshold values being different from each other; a first absolute value circuit that produces, in response to a first input signal, an absolute value of the first input signal as a first absolute value output signal, the first input signal being a signal obtained after inhibition of post-cursor intersymbol interference with a decision feedback equalizer; a second absolute value circuit that produces, in response to a second input signal, an absolute value of the second input signal as a second absolute value output signal, the second input signal being an output of a waveform equalizer before inhibition of the intersymbol interference; a first comparator for comparing the level of the first absolute value output signal with the first threshold value, the first comparator being adapted to produce a signal disconnection recognition signal only when the level of the first absolute value output signal is smaller than the first threshold value; a second comparator for comparing the level of the second absolute value output signal with the second threshold value, the second comparator being adapted to produce an incomming signal only when the level of the second absolute value output signal is larger than the second threshold value; and a counter adapted to receive the outputs of the first and second comparators to start counting up when the signal disconnection detection signal is produced from the first comparator, indicating a possibility of disconnection of the reception signal.

The counter resets a counted value and stops counting when it receives the incomming signal from the second comparator after starting of the count up, considering that the reception signal is not disconnected. The counter produces the signal disconnection detection signal, considering that the signal is actually disconnected, when the counting up is completed without the incomming signal from the second comparator after starting of the count up. Furthermore, the counter resets the counted value and produces the signal disconnection non-detection signal when the incomming signal is supplied from the second comparator in a reception signal disconnection state, considering that the reception signal is received.

A signal disconnection detection circuit according to a first aspect of the present invention comprises a threshold value generation circuit for generating first and second threshold values; first comparing means having a first positive comparator adapted to receive the first threshold value and a first input signal that is a signal obtained after inhibition of post-cursor intersymbol interference, a first multiplier adapted to receive the first threshold value, a first negative comparator adapted to receive the first input signal and an output of the multiplier, and a first AND circuit adapted to receive outputs of the first positive and negative comparators; second comparing means having a second positive comparator adapted to receive the second threshold value and a second input signal that is a signal obtained before inhibition of the post-cursor intersymbol interference, a second multiplier adapted to receive the second threshold value, a second negative comparator adapted to receive the second input signal and an output of the second multiplier, and a second AND circuit adapted to receive outputs of the second positive and negative comparators; and a counter adapted to receive the outputs of the first and second comparing means.

The first and second multipliers multiply the first and second threshold value, respectively, by −1 to produce threshold values for the first and second negative comparators, respectively. The first positive comparator produces a signal disconnection recognition signal only when the first input signal is smaller than the first threshold value. The second positive comparator produces an incomming signal only when the second input signal is larger than the second threshold value. The first negative comparator produces the signal disconnection recognition signal only when the first input signal is larger than the output of the first multiplier. The second negative comparator produces the incomming signal only when the second input signal is smaller than the output of the second multiplier. The first AND circuit produces a signal disconnection confirmation signal only when the first positive comparator and the first negative comparator produce the signal disconnection recognition signal. The second AND circuit produces a reception detection signal only when the second positive comparator and the second negative comparator produce the incomming signal.

The counter is adapted to receive the outputs of the first and second comparing means to start counting up when the signal disconnection confirmation signal is produced from the first comparing means, indicating a possibility of disconnection of the reception signal. The counter resets a counted value and stops counting when it receives the reception detection signal from the second comparing means after starting of the count up, considering that the reception signal is not disconnected. The counter produces the signal disconnection detection signal, considering that the reception signal is disconnected, when the counting up is completed without the reception detection signal from the second comparing means after starting of the count up. Furthermore, the counter resets the counted value and produces the signal disconnection non-detection signal when the reception detection signal is supplied from the second comparing means in a signal disconnection state, considering that the reception signal is received.

DESCRIPTION OF THE PREFERRED EMBODIMENTS

Figure 1:
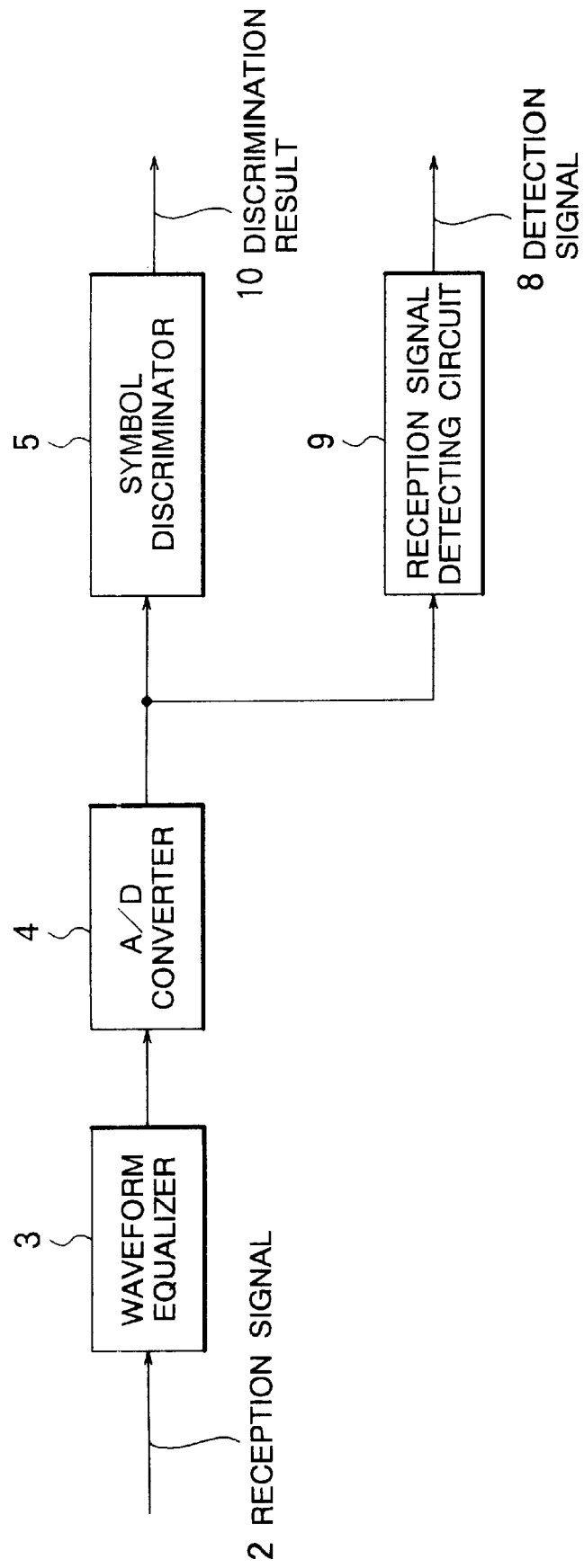
FIG. 1 is a block diagram showing a configuration of a reception circuit in a terminal device for a conventional digital subscriber line transmission system.

Referring to FIG. 1, a reception circuit in a terminal device for a conventional digital subscriber line transmission system is described. The reception circuit is disclosed in the above-cited laid-open patent. The reception circuit has a waveform equalizer 3, an A/D converter 4, a symbol discriminator 5, and a reception signal detecting circuit 9. The waveform equalizer 3 is for equalizing a waveform of a reception signal 2 and for shaping a waveform of the reception signal degraded due to transmission path characteristics. The A/D converter 4 is for converting an analog output of the waveform equalizer 3 into a digital signal. The signal discriminator 5 and the reception signal detecting circuit 9 each receives an output of the A/D converter 4. The reception circuit in practice also has components for timing extraction, which are not illustrated because of no association to the subject of the present invention.

Figure 2:
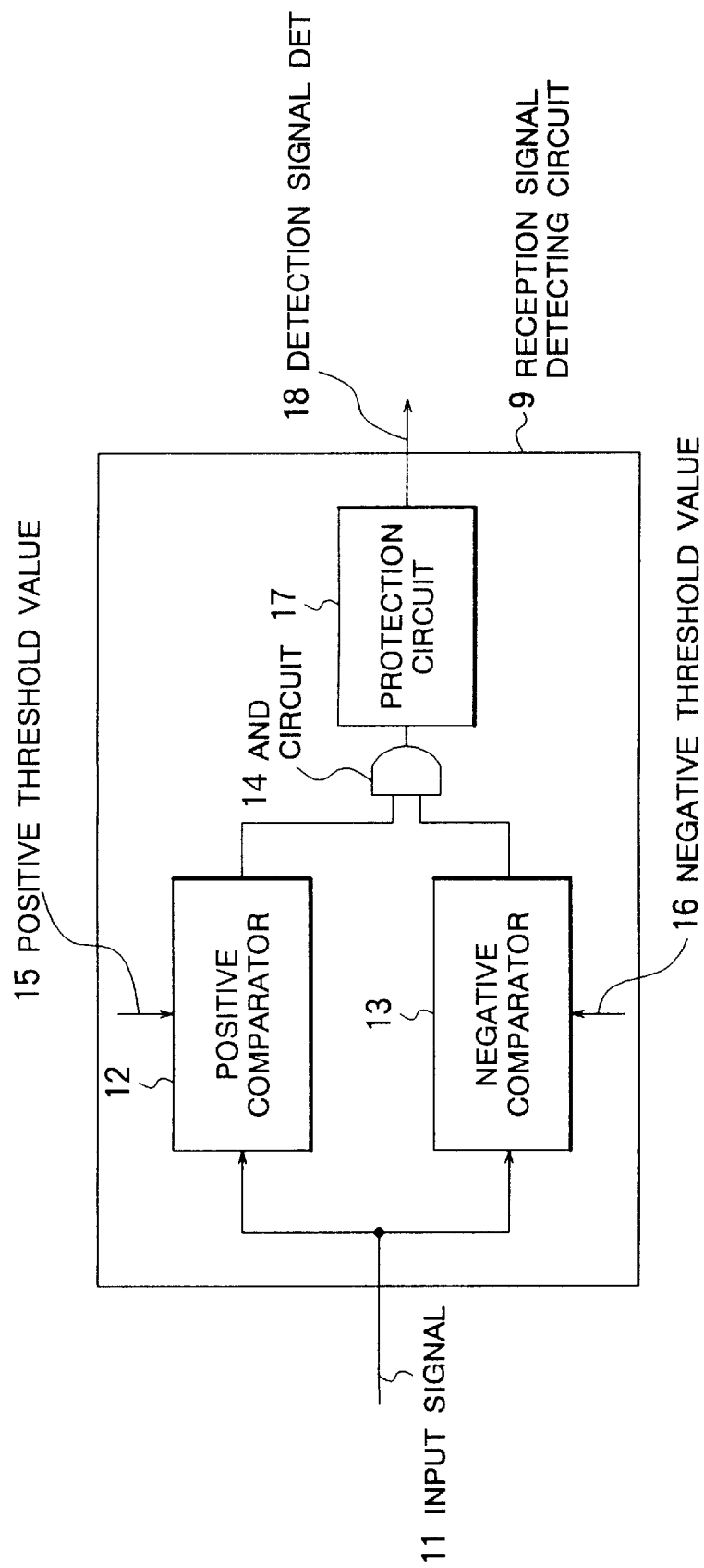
FIG. 2 is a block diagram showing a configuration of a signal disconnection detection circuit in FIG. 1.

Referring to FIG. 2, the reception signal detecting circuit 9 in FIG. 1 is described. The reception signal detecting circuit 9 has a positive comparator 12, a negative comparator 13, an AND circuit 14, and a protection circuit 17. The positive comparator 12 compares an input signal 11 with a positive threshold value 15. The negative comparator 13 compares the input signal 11 with a negative threshold value 16. The AND circuit 14 receives the outputs of the positive and negative comparators 12 and 13.

Operation of the reception signal detecting circuit 9 is described. In this example, a four-value signal is used with the levels of ±1 and ±3. The output of the A/D converter 4 is supplied to the positive comparator 12 and the negative comparator 13. The positive comparator 12 compares the input signal with the positive threshold value 15. The positive comparator 12 then produces a positive detection signal at a high level only when the input signal is smaller than the positive threshold value 15. On the other hand, the negative comparator 13 compares the input signal with the negative threshold value 16. The negative comparator 13 produces a negative detection signal at a high level only when the input signal is larger than the negative threshold value 16. The positive and negative threshold values 15 and 16 herein are determined between a transmission signal level and a zero level. In other words, the positive and negative threshold values 15 and 16 are determined to have a value that is smaller than the level range of the ±1 level transmission signal and that is larger than a noise level. Comparisons in the positive and negative comparators 12 and 13 are performed every time of symbol discrimination.

The protection circuit 17 is for use in avoiding incorrect decision due to, for example, noises on a line. The protection circuit 17 considers, as the detection of a reception signal, a predetermined number of protection stages being reached for the number of detection signals produced during a predetermined period by the positive and negative comparators 12 and 13. In response to the detection, the protection circuit 17 produces a detection signal DET 18.

An exemplified protection circuit 17 ANDs reproduction clocks that are extracted from the reception signal. The protection circuit 17 counts up the number of times (number of pulses) when both the positive and negative comparators 12 and 13 produce the signal of logic "1" during a unit time (such as a single frame of data). When the counted value is equal to or larger than a predetermined number, then the protection circuit 17 determines signal disconnection and produces a signal of logic "1". Otherwise, the protection circuit produces a signal of logic "0".

Reception circuits with a decision feedback equalizer have been proposed in order to improve equalization characteristics and reduce training time in the reception circuit having the above-mentioned configuration.

Figure 3:
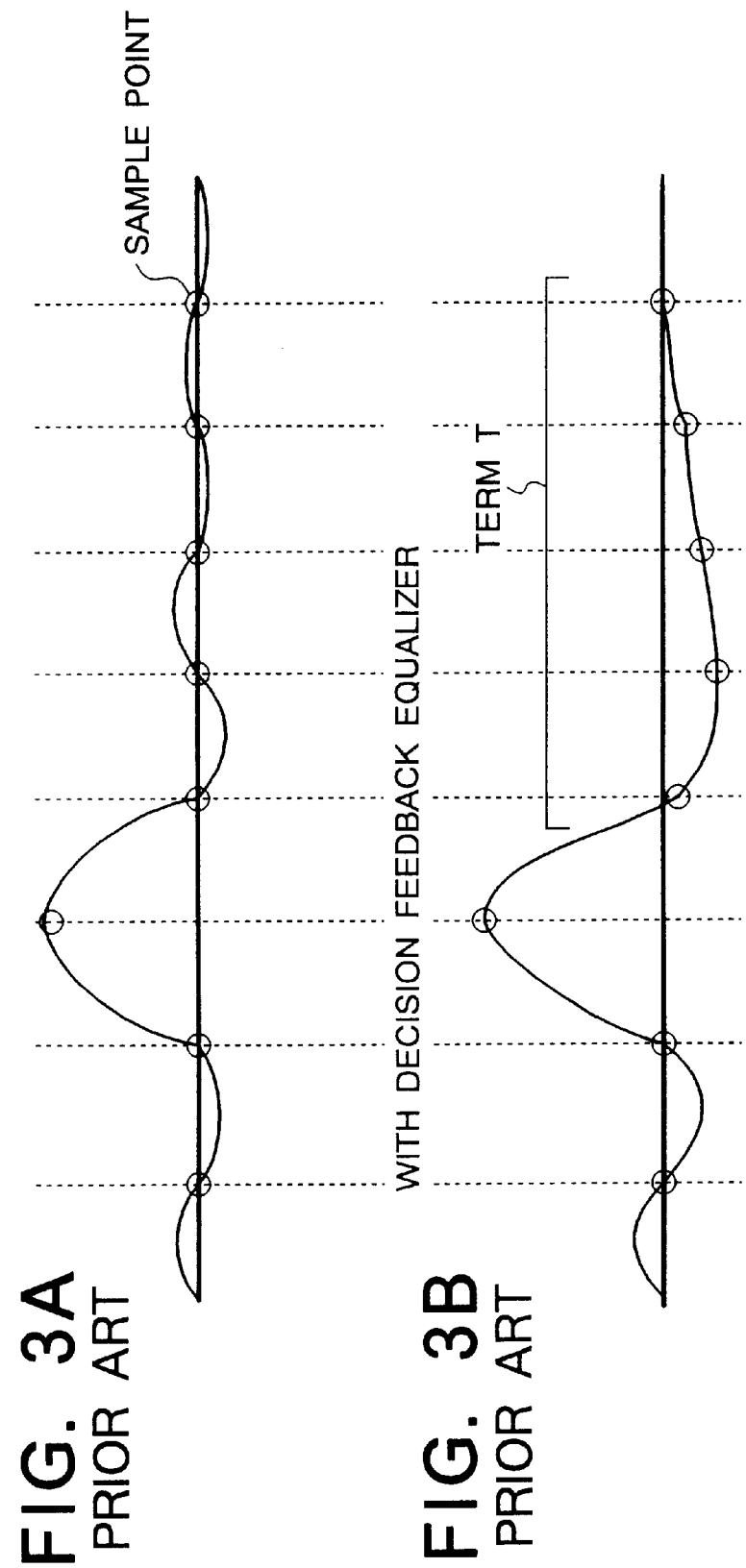
FIGS. 3A and 3B illustrate isolated response waveforms of outputs of a waveform equalizer with and without a decision feedback equalizer.

FIG. 3A corresponds to an isolated response waveform for the configuration without a decision feedback equalizer. FIG. 3B corresponds to an isolated response waveform for the configuration using a decision feedback equalizer.

As apparent from FIGS. 3A and 3B, the outputs with different isolated response waveforms are produced from the waveform equalizer with or without the decision feedback equalizer. This is because the decision feedback equalizer estimates a term T in FIGS. 3A and 3B and subtracts it. Without the decision feedback equalizer, the waveform equalizer 3 is required to make the amplitude obtained at all sample points other than a decision point be zero, as apparent from FIG. 3A. On the other hand, the waveform equalizer 3 is required to make only the amplitude obtained at sample points before the decision point be zero, as shown in FIG. 3B.

Figure 4:
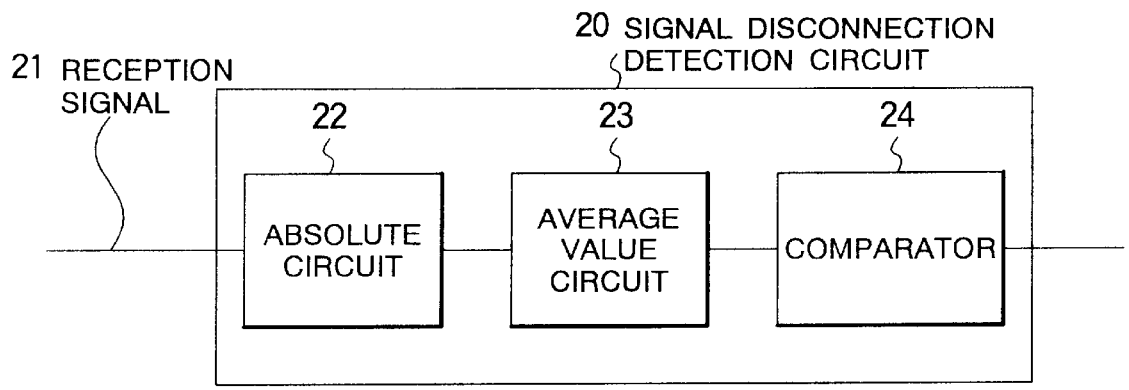
FIG. 4 is a block diagram showing another example of a conventional signal disconnection detection circuit.
Figure 5:
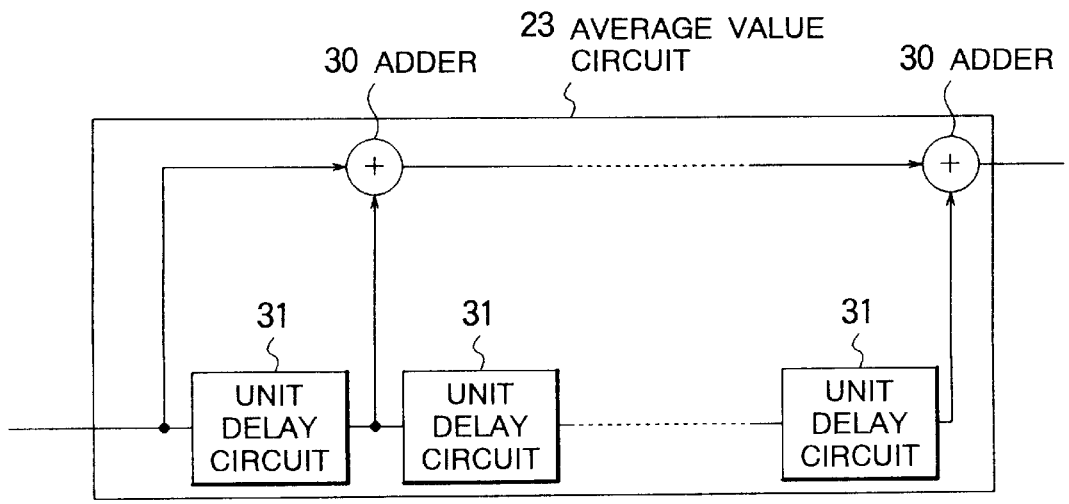
FIG. 5 is a circuit diagram showing a configuration of an average value circuit in FIG. 4.

Referring to FIGS. 4 and 5, a signal disconnection detection circuit with the decision feedback equalizer is described. In FIG. 4, a signal disconnection detection circuit 20 comprises an absolute value circuit 22, an average value circuit 23, and a comparator 24. A reception signal 21 is supplied to the absolute value circuit 22. An output of the absolute value circuit 22 is supplied to the average value circuit 23. An output of the average value circuit 23 is then supplied to the comparator 24. The absolute value circuit 22 takes an absolute value of the reception signal 21. The average value circuit 23 monitors absolute value signals for individual samples for a predetermined time and calculates an average value level during that period. The comparator 24 compares the average value level supplied from the average value circuit 23 with a predetermined threshold value. The comparator 24 determines the presence of a signal when the average value level is larger than the predetermined threshold. The comparator 24 determines the disconnection of the signal when the average value level is smaller than the predetermined threshold.

In FIG. 5, the average value circuit 23 is formed of a unit delay circuit 31 and an adder 30. The average value circuit 23 monitors the signals for a period determined by the unit delay circuit 31 to obtain an average of the absolute value signals for the individual samples.

However, the above mentioned signal disconnection detection circuit may sometimes not detect the disconnection of the signal when the decision feedback equalizer is used. The reason is as follows. The decision feedback equalizer estimates intersymbol interference due to postcursors according to the result of the symbol discrimination. The decision feedback equalizer thus produces an incorrect post-cursor estimation if it receives a signal other than the discrimination signal that is produced upon the disconnection, though the signal is actually disconnected. The signal disconnection detection circuit considers the incorrect estimation as a signal. This means that the decision feedback equalizer doesn't produce a zero output. The signal disconnection detection circuit detects no signal disconnection indefinitely.

The average value circuit 23 requires an arithmetic unit that enlarges the circuit itself. In addition, it takes a relatively long time to detect the signal disconnection after the reception of the signal because of the calculation for an average value during a certain period. Furthermore, detection characteristics for the comparator depend on the predetermined threshold value, so that it is difficult to determine this threshold value.

Figure 6:
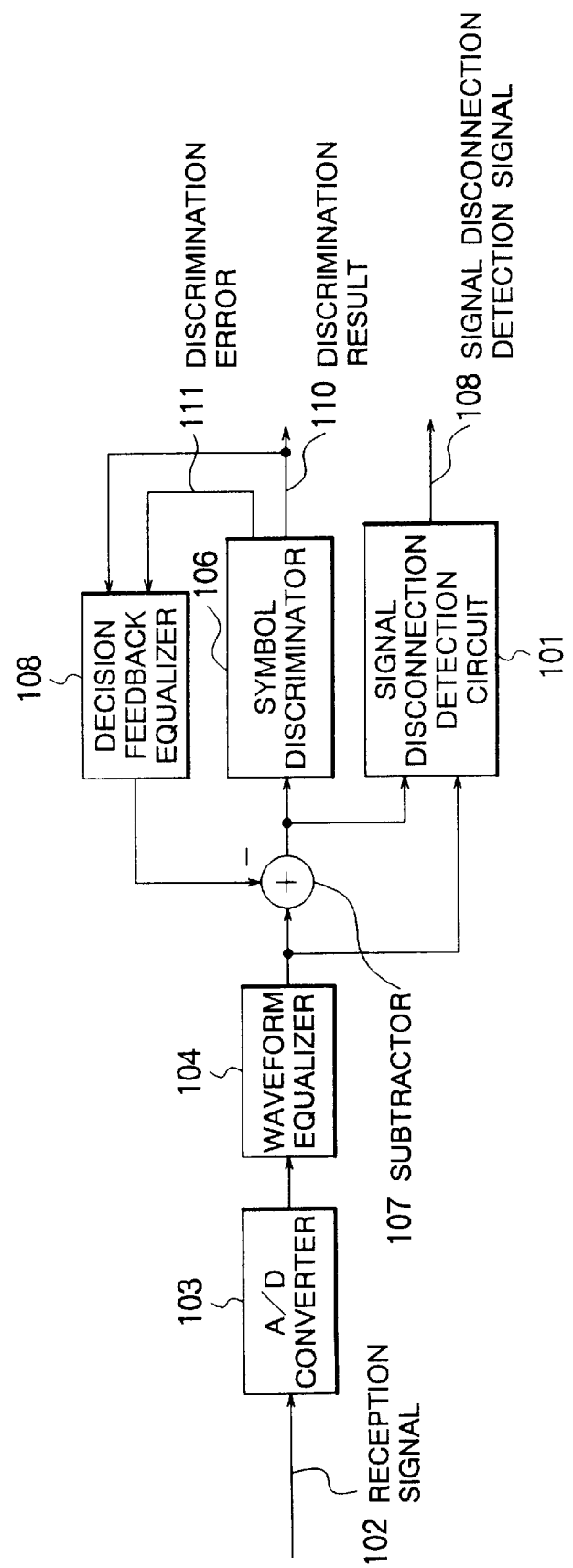
FIG. 6 is a block diagram showing a reception circuit in a terminal device for a digital transmission system to which the present invention is applied.
Figure 7:
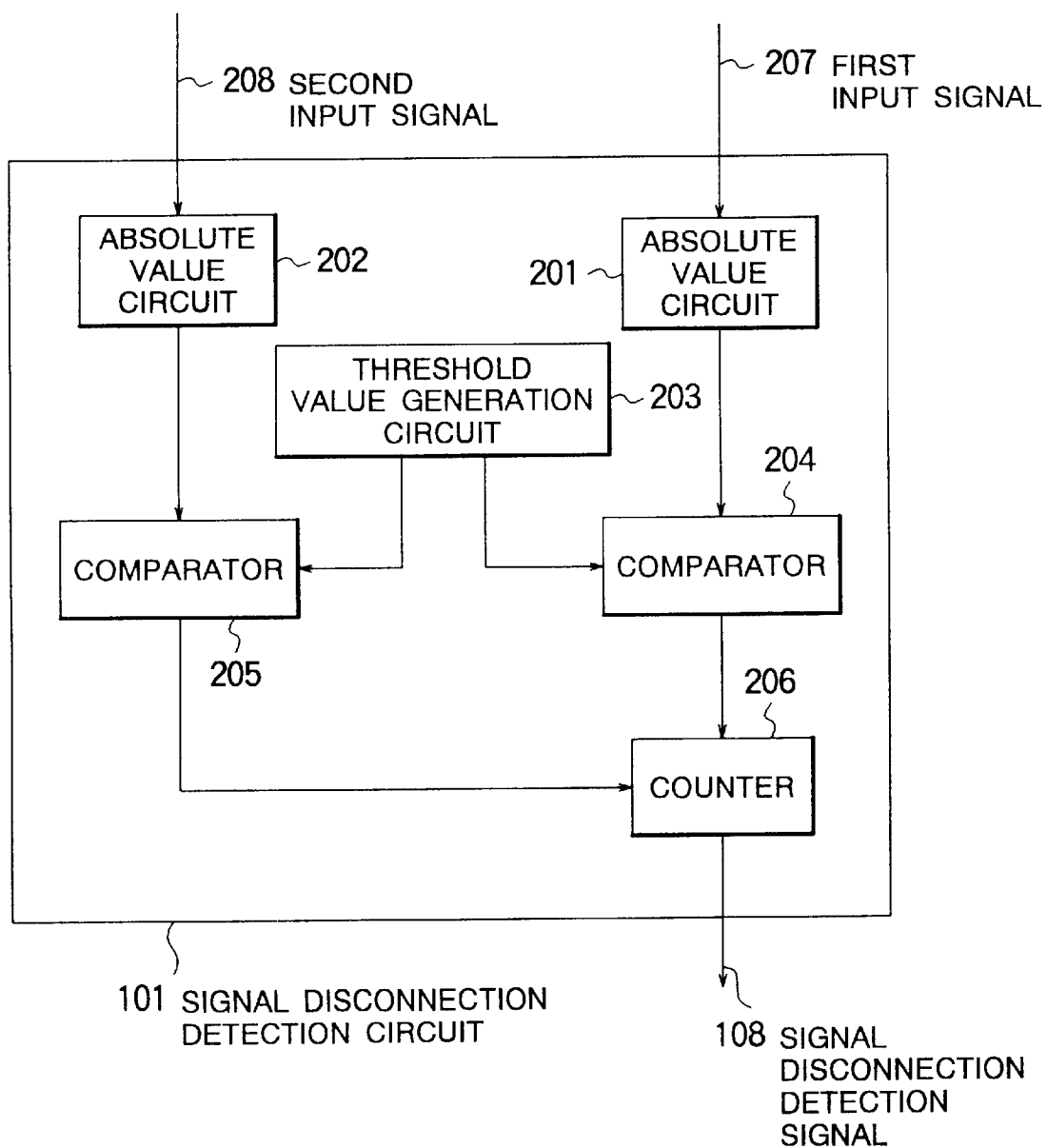
FIG. 7 is a block diagram showing a configuration of a signal disconnection detection circuit in FIG. 6.
Figure 8:
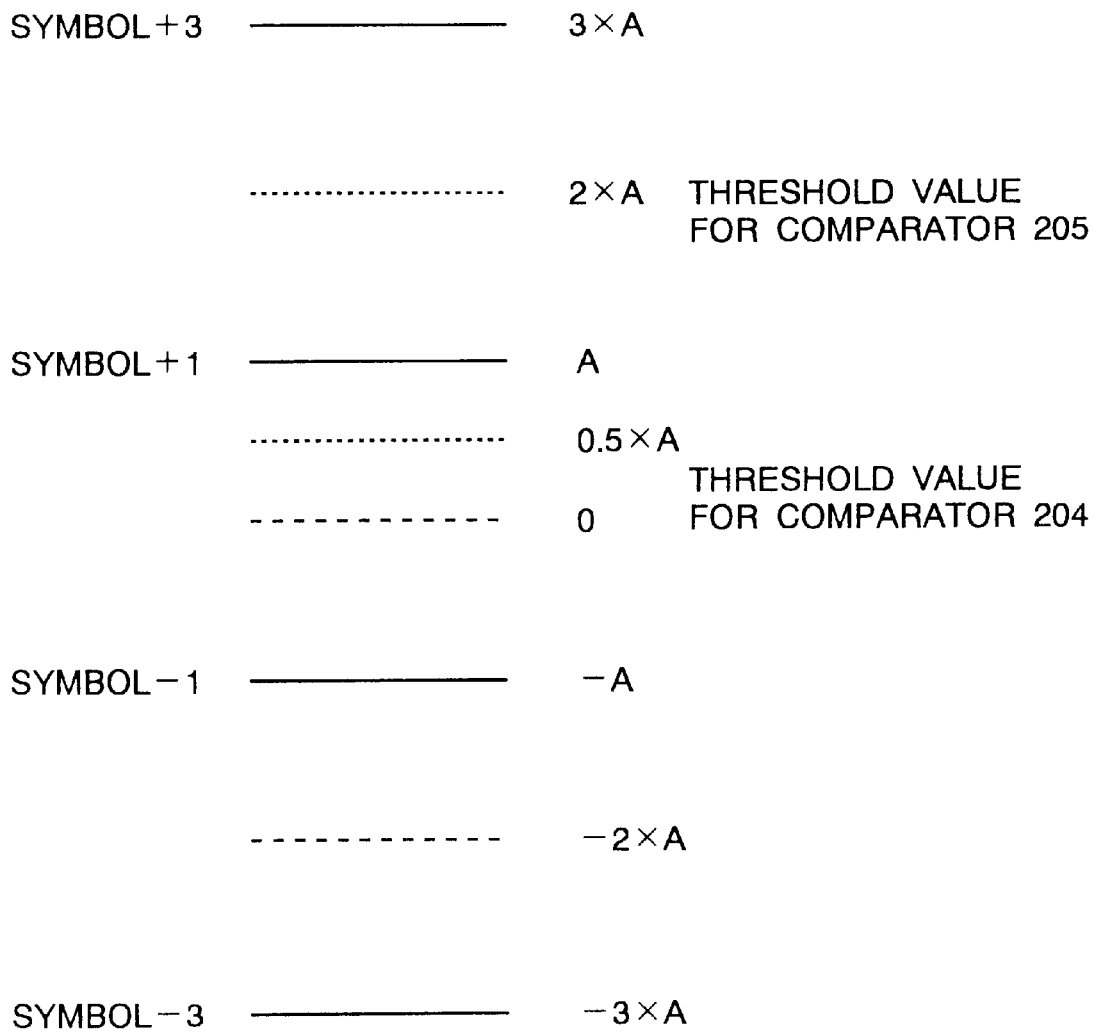
FIG. 8 is a view illustrating an example of settings for threshold value levels for a case where a transmission path symbol is allowed to take four values.

Referring to FIGS. 6, 7, and 8, a signal disconnection detection circuit according to a first embodiment of the present invention is described in detail. The signal disconnection detection circuit of the present invention solves the above-mentioned problems and ensures positive detection of the signal disconnection.

In FIG. 6, a reception circuit has an A/D converter 103, a waveform equalizer 104, a subtractor 107, a symbol discriminator 105, a decision feedback equalizer 106, and a signal disconnection detection circuit 101. A reception signal 102 is supplied to the A/D converter 103. An output of the A/D converter 103 is supplied to the waveform equalizer 104. An output of the waveform equalizer 104 and an output of the decision feedback equalizer 106 are supplied to the subtractor 107. An output of the subtractor 107 is supplied to the symbol discriminator 105. The decision feedback equalizer 106 receives an output of the symbol discriminator 105, i.e., a discrimination result 110, and a discrimination error 111. The signal disconnection detection circuit 101 receives an output of the waveform equalizer 104 and an output of the subtractor 107.

In FIG. 7, the signal disconnection detection circuit 101 has a threshold value generation circuit 203, a first absolute value circuit 201, a second absolute value circuit 202, a first comparator 204, a second comparator 205, and a counter 206. The first absolute value circuit 201 receives a first input signal 207 while the second absolute value circuit 202 receives a second input signal 208. The first comparator 204 receives an output of the first absolute value circuit 201 and a first output of the threshold value generation circuit 203. The second comparator 205 receives an output of the second absolute value circuit 202 and a second output of the threshold value generation circuit 203. The counter 206 receives outputs of the first and second comparators 204 and 205.

Operation of the signal disconnection detection circuit 101 is described. The signal disconnection detection circuit 101 is used in combination with the decision feedback equalizer 106 as illustrated in FIG. 6. In FIG. 7, the first input signal 207 is a signal obtained after inhibition of intersymbol interference of cost-cursor by means of the decision feedback equalizer 106. The second input signal 208 is a signal before the restriction of the intersymbol interference.

The absolute value circuit 201 takes an absolute value of the first input signal 207 and supplies that value to the comparator 204 as a first absolute value output signal. The comparator 204 compares the first threshold value generated by the threshold value generation circuit 203 with the level of the first absolute value output signal. The comparator 204 produces a signal disconnection recognition signal at a high level only when the level of the first absolute value output signal is smaller than the first threshold value.

Likewise, the absolute value circuit 202 takes an absolute value of the second input 208 and supplies that value to the comparator 205 as a second absolute value output signal. The comparator 205 compares the second threshold value generated by the threshold value generation circuit 203 with the level of the second absolute value output signal. The comparator 205 produces an incomming signal at a high level only when the level of the second absolute value output signal is larger than the second threshold value.

The counter 206 starts counting up operation when the output of the comparator 204 is HIGH, determining a possibility of signal disconnection. The counting up operation is achieved by using a sampling clock. If the output of the comparator 205 becomes HIGH after the start of the count ups, then the counting operation at the counter 206 is interrupted and the counted value is reset because it indicates no disconnection of the reception signal.

If the counter 206 completes its counting up operation without a high-level output signal from the comparator 205, the counter 206 then produces a signal disconnection detection signal 108 at a high level indicating that the signal is disconnected.

With the signal being disconnected and the comparator producing a high-level output, the counter 206 considers that the signal is received and resets its counted value. The signal disconnection detection signal 108 from the counter 206 becomes LOW. In other words, a low-level signal is produced as the signal disconnection non-detection signal.

The threshold value generation circuit 203 determines the thresholds such that the second threshold value for the comparator 025 is larger than the first threshold for the comparator 204.

FIG. 8 is a view illustrating an example of settings for threshold value levels for a case where the number of transmitted level (code level) is allowed to take four values, i.e., ±1 and ±3. For example, it is assumed that a signal level for a symbol +1 be A, then the first threshold value has a level of 0.5A for the comparator 204 and the second threshold value has a level of 2A for the comparator 205.

In the present invention, two signals are used to determine reception and disconnection of the signal. More specifically, the first input signal 207 is used to determine whether the signal is disconnected. The second input signal 208 is used to determine whether the signal is received. Different threshold values for the input signals 207 and 208 allows the second threshold value for the comparator 205 for determining reception of the signal to have a level higher than that of the symbol ±1. Accordingly, it can be avoided to determine a noise incorrectly as a signal. On the other hand, the presence of the signal reception is determined by using a signal before restriction of the intersymbol interference by the decision feedback equalizer. Accordingly, the disconnection of the signal can be detected positively even when the decision feedback equalizer produces an incorrect output with no signal present.

Figure 9:
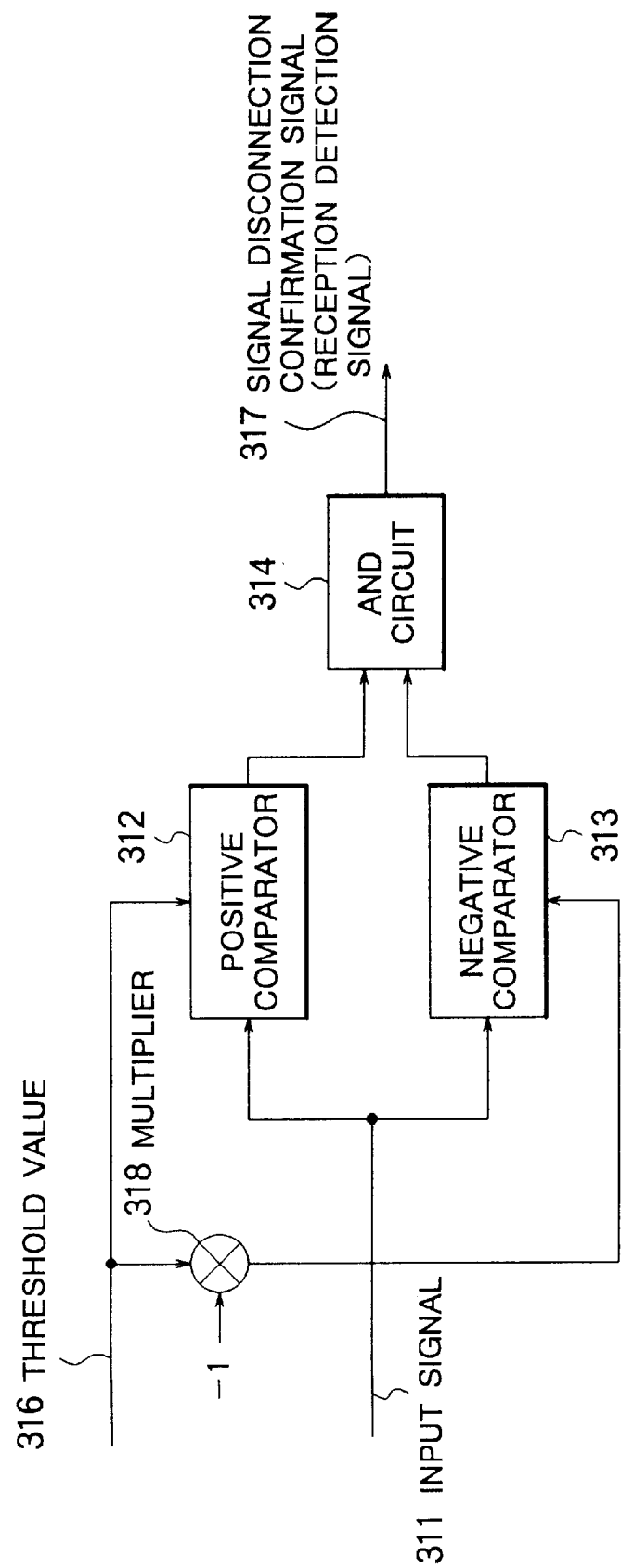
FIG. 9 is a block diagram showing another configuration of a signal disconnection detection circuit.

Referring to FIG. 9, a signal disconnection detection circuit according to a second embodiment of the present invention is described. In FIG. 9, the signal disconnection detection circuit of the second embodiment is similar to the one described in conjunction with FIG. 7 except that the absolute value circuits 201 and 202 and the comparators 204 and 205.

The absolute value circuit 201 and the comparator 204 in FIG. 7 correspond to a first comparator in FIG. 9. The first comparator has a multiplier 318, a positive comparator 312, a negative comparator 313, and an AND circuit 314. The multiplier 318 receives a threshold value 316 produced from the threshold value generation circuit (not shown in this figure). The positive comparator 312 receives an input signal 311 and a threshold value 316. The input signal 311 is obtained after eliminating intersymbol interference due to the post-cursors. The negative comparator 313 receives the input signal 311 and an output of the multiplier 318. The AND circuit 314 receives outputs of the positive and negative comparators 312 and 313.

The absolute value circuit 202 and the comparator 205 in FIG. 7 correspond to a second comparator in FIG. 9, as in the first comparator. The second comparator is similar to the first comparator. The threshold value for the second comparator is larger than the one for the first comparator.

Next, operation of the first comparator is described. The multiplier 318 generates a threshold value for the negative comparator 313 by means of multiplying the threshold value 316 by −1. The positive comparator 312 produces a first signal disconnection recognition signal at a high level when the level of the input signal 311 is smaller than the threshold value 316. Likewise, the negative comparator 313 produces a second signal disconnection recognition signal at a high level when the level of the input signal 311 is larger than the output of the multiplier 318.

The AND circuit 314 produces a signal disconnection confirmation signal 317 at a high level only when both the first signal disconnection recognition signal from the positive comparator 312 and the second signal disconnection recognition signal from the negative comparator 313 are high-level signals. In other words, the comparators 312 and 313 produce the high-level signal disconnection recognition signals only when the absolute value of the input signal 111 is smaller than the threshold value 316.

Next, operation of the second comparator is described. In this case, the input signal 311 is a signal before elimination of the intersymbol interference due to the post-cursors. The positive comparator 312 produces a first incoming signal at a high level when the level of the input signal 311 is larger than the threshold value 316. The negative comparator 313 produces a second incoming signal at a high level when the level of the input signal 311 is smaller than the output of the multiplier 318. The AND circuit 314 produces a reception detection signal 317 at a high level only when both the first and second incomming signals from the positive and negative comparators 312 and 313, respectively, are HIGH.

The counter 206 (see FIG. 7) starts counting up operation when a high-level signal disconnection confirmation signal 317 is produced from the AND circuit 314 that is the output of the first comparator, determining a possibility of the reception signal disconnection. If the AND circuit 314 produces a high-level reception detection signal 317 that is the output of the second comparator, then the counting operation at the counter 206 is interrupted and the counted value is reset because it indicates no disconnection of the reception signal. If the counter 206 completes its counting up operation without a high-level output signal from the second comparator, the counter 206 then produces a signal disconnection detection signal 108 at a high level indicating that the reception signal is disconnected. With the reception signal being disconnected and the second comparator producing a high-level output, the counter 206 considers that the signal is received and resets its counted value. Then a low-level signal is produced as the signal disconnection non-detection signal.

The logical levels in the above-mentioned first and second embodiments are only examples and it is understood that signal disconnection can be detected with logical levels other than those described above.

According to the present invention, the comparison is made with the different threshold values for the reception signals before and after the subtraction of the output of the decision feedback equalizer, by using two signals obtained before and after the elimination of the intersymbol interference due to the post-cursors. The two comparison results are used to determine signal disconnection. Therefore, the disconnection of the signal can be detected positively even when the decision feedback equalizer produces an incorrect output with no signal present.

What is claimed is:

1. A reception signal disconnection detection circuit comprising:

a threshold value generation circuit having first and second output terminals for generating first and second threshold values to produce simultaneously the first and the second threshold values from the first and the second output terminals, respectively, the first and the second threshold values being different from each other;

a first absolute value circuit that produces, in response to a first input signal, an absolute value of the first input signal as a first absolute value output signal, the first input signal being a signal obtained after inhibition of post-cursor intersymbol interference with a decision feedback equalizer;

a second absolute value circuit that produces, in response to a second input signal, an absolute value of the second input signal as a second absolute value output signal, the second input signal being an output of a waveform equalizer before inhibition of the intersymbol interference;

a first comparator for comparing the level of the first absolute value output signal with the first threshold value to produce a signal disconnection recognition signal only when the level of the first absolute value output signal is smaller than the first threshold value;

a second comparator for comparing the level of the second absolute value output signal with the second threshold value to produce an incoming signal only when the level of the second absolute value output signal is larger than the second threshold value; and a counter responsive to the signal disconnection recognition signal and the incoming signal for starting a count up when the signal disconnection recognition signal is received from the first comparator, indicating a possibility of disconnection of the reception signal, said counter resetting a counted value and stopping counting in response to the incoming signal from said second comparator after starting of the count up, considering that the reception signal is not disconnected, said counter producing a signal disconnection detection signal, considering that the reception signal is disconnected, when the counting up is completed without the incoming signal from said second comparator after starting of the count up, said counter resetting the counted value and not producing the signal disconnection detection signal when the incoming signal is supplied from said second comparator in a reception signal disconnected state, considering that the reception signal is received.

2. A signal disconnection detection circuit as claimed in claim 1, wherein the first and the second threshold values are determined by said threshold value generation circuit, the second threshold value being larger than the first threshold value.

3. A signal disconnection detection circuit as claimed in claim 1, wherein said first comparator produces the signal disconnection recognition signal at a high level only when the level of the first absolute value output signal is smaller than the first threshold value, said second comparator producing the incoming signal at a high level only when the level of the second absolute value output signal is larger than the second threshold value, said counter starting a count up operation, in response to the output of said first comparator, when the output of said first comparator is HIGH, determining a possibility of signal disconnection, said counter resetting the counted value and stopping counting up, determining that the reception signal is not disconnected, when the output of said second comparator becomes HIGH after the start of the count up, said counter producing the signal disconnection detection signal at a high level, determining that the reception signal is disconnected, when said counter completes its count up operation without a high-level output from said second comparator, and said counter considering that the reception signal is received and resetting its counted value with the signal being disconnected and said second comparator producing a high-level output, to produce the signal disconnection detection signal at a low level.

4. A signal disconnection detection circuit as claimed in claim 3, wherein the first and the second threshold values are determined by said threshold value generation circuit such that the second threshold value is larger than the first threshold value.

5. A reception signal disconnection detection circuit comprising:

a threshold value generation circuit for generating first and second threshold values;

first comparing means having a first positive comparator that receives the first threshold value and a first input signal that is a signal obtained after inhibition of post-cursor intersymbol interference, a first multiplier that receives the first threshold value, a first negative comparator that receives the first input signal and an output of the multiplier, and a first AND circuit that receives outputs of the first positive and the first negative comparators;

second comparing means having a second positive comparator that receives the second threshold value and a second input signal that is a signal obtained before inhibition of the post-cursor intersymbol interference, a second multiplier that receives the second threshold value, a second negative comparator that receives the second input signal and an output of the second multiplier, and a second AND circuit that receives outputs of the second positive and the second negative comparators; and a counter for receiving the outputs of said first and said second comparing means, wherein the first and the second multipliers multiply the first and the second threshold value, respectively, by −1 to produce threshold values for the first and the second negative comparators, respectively;

the first positive comparator producing a first signal disconnection recognition signal only when the first input signal is smaller than the first threshold value;

the second positive comparator producing a first incoming signal only when the second input signal is larger than the second threshold value;

the first negative comparator producing a second signal disconnection recognition signal only when the level of the first input signal is larger than the output of the first multiplier;

the second negative comparator producing a second incoming signal only when the level of the second input signal is smaller than the output of the second multiplier;

the first AND circuit producing a signal disconnection confirmation signal only when the first positive comparator and the first negative comparator produce the first and second signal disconnection recognition signals; and the second AND circuit producing a reception detection signal only when the second positive comparator and the second negative comparator produce the first and second incoming signals;

said counter receiving the outputs of said first and said second comparing means to start counting up when the signal disconnection confirmation signal is produced from said first comparing means, indicating a possibility of disconnection of the reception signal, said counter resetting a counted value and stops counting up when it receives the reception detection signal from said second comparing means after starting of the count up, considering that the reception signal is not disconnected, said counter producing a signal disconnection detection signal, considering that the reception signal is disconnected, when the count up is completed without the reception detection signal from said second comparing means after starting of the count up, said counter resetting the counted value and not producing the signal disconnection signal when the reception detection signal is supplied from said second comparing means in a signal disconnection state, considering that the reception signal is received.

6. A signal disconnection detection circuit as claimed in claim 5, wherein said first positive comparator produces the first signal disconnection recognition signal at a high level only when the level of the first input signal is smaller than the first threshold value, said second positive comparator producing the first incoming signal at a high level only when the level of the second input signal is larger than the second threshold value, said first negative comparator producing the second signal disconnection recognition signal at a high level when the level of the first input signal is larger than the output of the first multiplier, said second negative comparator producing the second incoming signal at a high level when the level of the second input signal is smaller than the output of the second multiplier, the first and the second AND circuits producing a high-level signal only when both the outputs of said first and second positive comparators as well as of said first and said second negative comparators are high, said counter starting a counting up operation when the output of said first comparing means is HIGH, determining a possibility of signal disconnection, said counter resetting the counted value and stops counting up, determining that the reception signal is not disconnected, when the output of said second comparing means becomes HIGH after the start of the count up, said counter producing the signal disconnection detection signal at a high level, determining that the reception signal is disconnected, when said counter completes its counting up operation without a high-level output from said second comparing means, and said counter considering that the reception signal is received and resets its counted value with the reception signal being disconnected and said second comparing means producing a high-level output, to produce the signal disconnection detection signal at a low level.

* * * * *